United States Patent Office 3,629,137
Patented Dec. 21, 1971

3,629,137
GLASS FOR LASER
Isao Masuda, Tokyo, Japan, assignor to Hoya
Glass Works, Limited, Tokyo, Japan
No Drawing. Filed Oct. 8, 1969, Ser. No. 864,880
Claims priority, application Japan, Oct. 12, 1969,
43/74,339
Int. Cl. C09k 1/54; C03c 3/10, 3/28
U.S. Cl. 252—301.4 F                       4 Claims

ABSTRACT OF THE DISCLOSURE

A $SiO_2$—$R_2O$—$PbO$ glass containing $Nd^{3+}$ ion as fluorescent element can be improved in its fluorescent properties by having $V^{5+}$ ion present in said glass, whereby the resulting glass is markedly useful when used as the material for laser having a higher quantum efficiency.

---

The present invention concerns a glass for use in laser, and more particularly, it relates to a $$SiO_2\text{—}R_2O\text{—}PbO$$

glass containing $Nd^{3+}$ as the fluorescent ion, and still more particularly, it concerns the glass of the type described but having greatly improved fluorescent properties and the invention also relates to a process for manufacturing such a glass.

The fluorescent properties, i.e., fluorescent intensity, fluorescence life time, half width and quantum efficiency, of a glass containing transition elements and rare earth elements, have an intimate relation to the emission properties of the laser. The higher the intensity of the spontaneous emission of the material used is, the lower is the threshold energy required for light amplification, or, in other words, the higher becomes the quantum efficiency. Furthermore, the intensity of spontaneous emission is proportionally related to both the intensity of the incident rays and the life time of the natural fluorescence. The life time of natural fluorescence indicates the capability of maintaining a number of photons in the excited state for stimulated emission and, therefore, is a measure of determining whether or not the material is suitable for a giant pulse emission. As above, laser is principally based on the same mechanism as the fluorescent emission so that the quality of the material for laser may be determined by and expressed in terms of its fluorescent properties.

Many efforts have been made heretofore to provide glasses useful for laser having advantageous fluorescent properties. Generally, fluorescent materials can be made from a combination of basic materials and activating agents. If any third component is added, however, the fluorescent properties are extremely impaired.

On the contrary, I have unexpectedly discovered during my research on fluorescent glasses that, with a specific glass system advantageous for laser, an addition of a small amount of a certain element thereto imposes a significant influence on the fluorescent properties, and that the resulting glass is outstandingly advantageous when used in laser in that it is capable of effecting stimulated emission with an extremely lower level of threshold energy.

Therefore, the primary object of the present invention is to provide a glass having advantageous fluorescent properties which is capable to achieve a light amplification with a higher efficiency.

Another object of the present invention is to provide a process for improving a glass system containing fluorescent or activating element, with respect to fluorescent properties.

Still another object of the present invention is to provide a specific combination of base glass, an activating ion and a third component or sensitizer, whereby a glass having improved fluorescent properties can be produced.

Other objects and advantages of the present invention will become apparent from the following detailed description.

Although, in many cases, an addition of the third element into the fluorescent material made from the combination of a basic material and an activating element results in the degradation of the fluorescent properties, as stated above. It has unexpectedly been discovered by me, however, that in a $SiO_2$—$R_2O$—$PbO$ glass (wherein: R represents Li, Na or K) containing $Nd^{3+}$ as the activating agent, if $V^{5+}$ is selected as the third element, the presence thereof in said glass results in an exceptionally considerable improvement of fluorescent properties of this glass. In short, $V^{5+}$ ion has been discovered to have an action of sensitizing the glass as to fluorescence. Although this sensitizing mechanism has not fully been understood and is not intended to be ascribed to a specific theory, it may be such that the energy absorbed by the higher valence $V^{5+}$ ion, is converted to have a level suitable for stimulating $Nd^{3+}$ ion and transmitted to the latter. Such an effect has been found to be achieved in a specific combination of the base glass, activating ion and sensitizer. Thus, $V^{5+}$ ion acts as a sensitizer only when $Nd^{3+}$ ion is selected as a fluorescent ion in a certain concentration range with the $SiO_2$—$R_2O$—$PbO$ base glass.

The base glass composition useful for making a material for laser having improved fluorescent properties according to the present invention consists of, by mol, 85–60% $SiO_2$, 10–30% $R_2O$ (where R is Li, Na or K) and 5–20% PbO, and as a fluorescent element on the oxide basis, 0.1–3.0% by mol of $Nd_2O_3$ is added to the base glass. To such a glass composition containing the fluorescent element, $V^{5+}$ ion may be added in the range of, on the oxide basis, 0.001–0.1% by mol of $V_2O_5$.

With respect to the above range of the concentration of $V^{5+}$ ion, if there are present $V^{5+}$ ions in a concentration higher than the upper limit, the excess $V^{5+}$ ions come to act rather as impurities to degrade the fluorescent properties of the glass. If the amount of $V^{5+}$ ions becomes lower than the above lower limit, the effect of $V^{5+}$ as sensitizer will decrease, and therefore, $V^{5+}$ ions should be presented in the above range of the concentration.

The glass of the present invention may be obtained by melting a batch containing the oxide materials in the aforementioned ratio. Alternatively, any components of the present glass may be incorporated into a batch in other forms than oxide provided that after the completion of melting the resulting glass satisfies the above requirement as to glass composition on the oxide basis. Further, in melting a glass batch, it would be better to conduct the melting under an oxidizing atmosphere so as to maintain the vanadium ions at a valence of 5+ in the glass. The glass batch of the present invention may be melted in a platinum crucible in the same manner as optical glass at a temperature of not lower than about 1300° C. preferably about 1300–1350° C. with agitation and then refined uniformly and homogeneously. The resulting glass melt is poured out into a mold. Alternatively, it may be melted in a crucible made of refractory material in the same manner with the exception that the melt is cooled down with the crucible.

The present invention will be explained with respect to the following examples.

EXAMPLES I-VI

Each glass batch having a composition on the oxide basis as shown in the following table was melted in a platinum crucible at a temperature of 1300–1350° C. under an oxidizing atmosphere with agitation. After uniformly refining, the melt was poured into a mold. Each glass sample was determined as to the relative intensity of fluorescence, life time and relative quantum efficiency. The results are shown in the following Table 1.

TABLE 1

|  | Control | 1 | 2 | 3 | 4 | 5 | 6 |
|---|---|---|---|---|---|---|---|
| $SiO_2$ | 70.0 | 70.0 | 70.0 | 75.0 | 75.0 | 80.0 | 70.0 |
| $K_2O$ | 20.0 | 20.0 | 20.0 | 15.0 | 15.0 | 10.0 | 20.0 |
| PbO | 10.0 | 10.0 | 10.0 | 10.0 | 10.0 | 10.0 | 10.0 |
| $Nd_2O_3$ | 1.0 | 1.0 | 1.0 | 0.75 | 1.0 | 1.0 | 1.0 |
| $V_2O_5$ | 0 | 0.005 | 0.01 | 0.005 | 0.002 | 0.002 | 0.05 |
| Relative intensity of fluorescence | 100 | 122 | 120 | 114 | 127 | 127 | 106 |
| Life time (second) | 750 | 830 | 820 | 890 | 820 | 800 | 790 |
| Quantum efficiency | 100 | 135 | 133 | 127 | 140 | 137 | 111 |

As clearly seen from the results shown in the above table, the glasses of the present invention have outstandingly higher quantum efficiencies with improved intensities of fluorescence and life time compared with the control which did not contain any vanadium ions.

What is claimed is:

1. A glass for use in laser having improved fluorescent properties comprising on the oxide basis by mol 85–60% $SiO_2$, 10–30% $R_2O$ (wherein R represents Li, Na or K) 5–20% PbO, 0.1–3.0% $Nd_2O_3$ and 0.001–0.1% $V_2O_5$.

2. A process for producing a glass for use in laser having improved fluorescent properties characterized by melting a batch containing on the oxide basis by mol 85–60% $SiO_2$, 10–30% $R_2O$ (wherein R represents Li, Na or K), 5–20% PbO, 0.1–3.0% $Nd_2O_3$ and 0.001–0.1% $V_2O_5$ at a temperature of at least 1300° C.

3. A process according to claim 2, wherein said temperature is in the range of about 1300–1350° C.

4. A process according to claim 2 wherein said melting is conducted in an oxidizing atmosphere.

References Cited

UNITED STATES PATENTS 3,422,025  1/1969  Snitzer et al. _____ 252—301.4 F

OTHER REFERENCES

Snitzer: Glass Lasers, The Glass Industry, September 1967, pages 498–503. Copy in Patent Office Search Center.

ROBERT D. EDMONDS, Primary Examiner

UNITED STATES PATENT OFFICE
CERTIFICATE OF CORRECTION

Patent No. 3,629,137    Dated December 21, 1971

Inventor(s) Masuda, Isao

It is certified that error appears in the above-identified patent and that said Letters Patent are hereby corrected as shown below:

Priority date should be October 12, 1968 instead of October 12, 1969.

Signed and sealed this 4th day of July 1972.

(SEAL)
Attest:

EDWARD M. FLETCHER, JR.
Attesting Officer

ROBERT GOTTSCHALK
Commissioner of Patents